United States Patent
Qiao et al.

(10) Patent No.: US 7,324,268 B2
(45) Date of Patent: Jan. 29, 2008

(54) OPTICAL SIGNAL AMPLIFIER AND METHOD

(75) Inventors: Lijie Qiao, Ottawa (CA); Paul J. Vella, Ottawa (CA)

(73) Assignee: BTI Photonic Systems Inc., Ottawa, Ontario (CA)

( * ) Notice: Subject to any disclaimer, the term of this patent is extended or adjusted under 35 U.S.C. 154(b) by 87 days.

(21) Appl. No.: 10/800,747

(22) Filed: Mar. 16, 2004

(65) Prior Publication Data

US 2005/0111078 A1    May 26, 2005

Related U.S. Application Data

(60) Provisional application No. 60/523,666, filed on Nov. 21, 2003.

(51) Int. Cl.
*H01S 4/00* (2006.01)
*H04B 10/12* (2006.01)

(52) U.S. Cl. .............. 359/337.1; 359/337; 359/337.11; 398/83

(58) Field of Classification Search ... 359/337–337.21; 398/83
See application file for complete search history.

(56) References Cited

U.S. PATENT DOCUMENTS

| | | | | |
|---|---|---|---|---|
| 5,675,432 | A * | 10/1997 | Kosaka | 359/337.13 |
| 6,049,417 | A * | 4/2000 | Srivastava et al. | 359/337.4 |
| 6,049,418 | A | 4/2000 | Srivastava et al. | 359/341 |
| 6,356,383 | B1 * | 3/2002 | Cornwell et al. | 359/334 |
| 6,417,960 | B1 * | 7/2002 | Shimojoh | 359/337.2 |
| 6,424,459 | B1 | 7/2002 | Yokota | 359/341.42 |
| 6,483,632 | B1 | 11/2002 | Jolley et al. | 359/337.4 |
| 6,580,552 | B2 | 6/2003 | Welch | 359/341.32 |
| 6,621,625 | B1 * | 9/2003 | Zhang et al. | 359/341.42 |
| 6,738,181 | B1 * | 5/2004 | Nakamoto et al. | 359/337 |
| 2002/0105694 | A1 * | 8/2002 | DeGrange et al. | 359/127 |
| 2002/0105695 | A1 * | 8/2002 | DeGrange et al. | 359/127 |
| 2002/0149817 | A1 * | 10/2002 | Kiliccote et al. | 359/119 |
| 2002/0181090 | A1 | 12/2002 | Song et al. | 359/349 |
| 2002/0181091 | A1 | 12/2002 | Song et al. | 359/349 |
| 2003/0118347 | A1 * | 6/2003 | Papaparaskeva et al. | 398/147 |
| 2004/0076437 | A1 * | 4/2004 | Kaspit et al. | 398/83 |

* cited by examiner

*Primary Examiner*—Jack Keith
*Assistant Examiner*—Eric Bolda

(57) ABSTRACT

An optical amplification apparatus is provided comprising a plurality of fiber amplification media segments which are concatenated in series wherein subsequent to each fiber amplification media segment one or more wavelengths is dropped so as to exploit a gain versus fiber amplification media physical length characteristic. By exploiting the gain versus fiber amplification media physical length characteristic in such a manner it is possible to achieve a substantially flat gain response for a multi-wavelength output of the optical amplification apparatus. Some embodiments of the invention combine noise suppression and additional gain flattening on one or more wavelengths. Embodiments of the optical amplification apparatus can be used in red-band wavelength range applications of coarse wavelength division multiplexing (CWDM). Some embodiments of the invention also provide that the optical amplification apparatus can be used as a hybrid dense wavelength division multiplexing (DWDM) and CWDM optical amplifier.

36 Claims, 6 Drawing Sheets

OPTICAL SIGNAL AMPLIFIER AND METHOD

RELATED APPLICATIONS

This application claims priority from U.S. Provisional Patent Application No. 60/523,666 filed on Nov. 21, 2003.

FIELD OF THE INVENTION

The invention relates to optical signal amplifiers and methods for wavelength division multiplexing (WDM) applications, such as coarse wavelength division multiplexing (CWDM) applications.

BACKGROUND OF THE INVENTION

Coarse wavelength division multiplexing (CWDM) is a relatively new application of conventional wavelength division multiplexing (WDM) that is being used in short haul and metro networks. The more well-known long haul and ultra-long haul dense wavelength division multiplexing (DWDM) techniques that became popular in the mid to late 1990s allow for many wavelengths to be transmitting on a single fiber, but these DWDM techniques are expensive. The expense is a result of tighter tolerances required for many components of an overall communication system as more wavelengths are multiplexed onto a single fiber. To avoid cross talk between adjacent wavelengths, lasers must be controlled to maintain a transmission wavelength line width in an extremely limited wavelength range. This is done through the use of TEC (Thermo-electric cooling) devices which can be expensive. DWDM bandpass filters must also have tightly controlled specifications to ensure adjacent wavelengths are suppressed to a satisfactory level and do not interfere with a specific bandpass channel. These control systems and filters are expensive due to research and development costs and the difficulty involved with their manufacture.

One of the goals of metro networks is to provide a communication network for a localized area at a minimum cost. One simple manner to achieve this is to use fewer wavelengths on a single fiber. In this way specifications of the system components can be eased. Laser transmission wavelengths are allowed to vary and WDM bandpass filters can have wider passband bandwidths. If looser tolerances are acceptable, the cost of the overall system is reduced.

Typically, signals carried on short haul and metro networks have not required signal amplification as network links were less than 50 kms. However, as short haul and metro networks become more popular and find greater use, they are growing in size to include parts of the access network to where amplification of the signals carried by the networks is a requirement.

This creates the dilemma of how to provide cost effective optical signal amplification for short haul and metro network markets. Conventional C-band (typically 1528 nm to 1565 nm) plus L-band (typically 1570 nm to 1605 nm) optical amplifiers of the type used in DWDM applications are more expensive than metro network markets wish to pay.

Currently, semi-conductor amplifier (SOA) technology is capable of providing optical signal amplification for blue-band CWDM applications. Blue-band usually covers the wavelengths 1470, 1490, 1510, 1530 nm, the blue band including wavelength's in the S-band and the C-band. However, SOA technology has not yet been able to provide amplification for red-band CWDM applications in the same cost effective manner. Red-band covers the wavelengths 1550, 1570, 1590, 1610 nm, the red band including wavelengths in the C-band and the L band.

SUMMARY OF THE INVENTION

According to one broad aspect, the invention provides an apparatus comprising a plurality of optical amplification media segments which are concatenated in series wherein subsequent to each optical amplification media segment a respective one or more wavelengths in a respective wavelength range is dropped so as to exploit a gain versus optical amplification media physical length characteristic.

In some embodiments, each amplification media segment comprises a fiber amplification media segment.

In some embodiments, each particular subsequent concatenated fiber amplification media segment adds an additional physical length of fiber amplification media to the apparatus so as to exploit the gain versus fiber amplification media physical length characteristic wherein each particular additional physical length of fiber amplification media is chosen so that an overall length of fiber amplification media, including the particular fiber amplification media segment and all preceding physical lengths of fiber amplification media, when supplied with pump laser energy, provide a respective gain response over the respective wavelength range containing the respective one or more wavelengths to be dropped after the particular segment.

In some embodiments, the apparatus adapts to perform amplification in an overall wavelength range comprising at least 1523 nm to 1617 nm.

In some embodiments, the wavelengths are located on a standard telecommunications grid with a wavelength spacing of substantially 20 nm.

In some embodiments, the wavelength ranges are centred at 1550 nm, 1570 nm, 1590 nm, and 1610 nm.

In some embodiments, the wavelength ranges are centred at 1530 nm, 1550 nm, 1570 nm, 1590 nm, and 1610 nm.

In some embodiments, the wavelength ranges are 1550±6.5 nm, 1570±6.5 nm, 1590±6.5 nm and 1610±6.5 nm.

In some embodiments, the wavelength 1550±6.5 nm is dropped after a first segment of the plurality of amplification media segments, the wavelengths 1570±6.5 nm and 1590±6.5 nm are dropped after a second segment of the plurality of amplification media segments, and the wavelength 1610±6.5 nm is dropped after a third of the plurality of amplification media segments.

In some embodiments, the wavelength ranges are 1530±6.5 nm, 1550±6.5 nm, 1570±6.5 nm, 1590±6.5 nm and 1610±6.5 nm.

In some embodiments, the apparatus is used to amplify a plurality of dense wavelength division multiplexed (DWDM) wavelengths in the range 1523 nm to 1670 nm, which are located on a standard telecommunications grid with a frequency spacing of substantially 25 GHz, 50 GHz, 100 GHz, or 200 GHz.

In some embodiments, the plurality of fiber amplification media segments are collectively supplied with pump laser energy using at least one pump laser.

In some embodiments, the apparatus further comprises a plurality of couplers wherein each of the plurality of fiber amplification media segments is supplied with a required level of pump laser energy from the at least one pump laser using at least one of the plurality of couplers to make a gain response for all of the wavelength channels approximately equal.

In some embodiments, the plurality of fiber amplification media segments are collectively supplied with pump laser energy using only one pump laser.

In some embodiments, the apparatus further comprises a plurality of couplers wherein each of the plurality of fiber amplification media segments is supplied with a required level of pump laser energy from the one pump laser using at least one of the plurality of couplers.

In some embodiments, the plurality of fiber amplification media segments are lengths of erbium doped fiber (EDF).

In some embodiments, the apparatus further comprises at least one noise suppression filter (NSF) filtering out ASE (amplified spontaneous emission) noise in at least one of the wavelength ranges.

In some embodiments, after a last of the plurality of amplification media segments, the one or more wavelengths to be dropped are dropped by passing an output of the last amplification media segment through a NSF (noise suppression filter).

In some embodiments, the NSF has a transmission characteristic for a wavelength range which flattens the gain characteristic of the amplification media over the wavelength range.

In some embodiments, the wavelength range of the NSF is about 1603 nm to 1617 nm.

In some embodiments, the apparatus further comprises a plurality of optical fiber taps and a plurality of photodetectors used in combinations at an input and an output of the apparatus for power monitoring a multi-wavelength optical input and a multi-wavelength optical output.

In some embodiments, the apparatus further comprises a plurality of optical isolators, wherein each of the plurality of fiber amplification media segments is located in series with a corresponding individual optical isolator of the plurality of optical isolators.

In some embodiments, the apparatus further comprises, for each pair of adjacent amplification media segments comprising a preceding segment and a subsequent segment, a respective multi-port add-drop multiplexer between the preceding segment and the subsequent segment, each multi-port add-drop multiplexer being adapted to receive an amplified signal from the preceding segment, drop a wavelength to be dropped after the preceding segment, and passing a remaining signal on towards the subsequent segment.

In some embodiments, the apparatus further comprises a multi-port optical multiplexer connected to combine the dropped wavelengths.

In some embodiments, each multi-port add-drop multiplexer is a four port add-drop multiplexer.

In some embodiments, each four port add-drop multiplexer comprises: a first port for inputting a first signal which is an output of the preceding amplification media segment; a second port for outputting a second signal which is passed to the subsequent amplification media segment for further amplification; a third port for outputting a third signal; a fourth port for inputting a fourth signal from a third port of a subsequent add-drop multiplexer or in the case of the last add drop multiplexer, the fourth signal being an output of the last amplification segment; wherein each add-drop multiplexer passes the at least one wavelength to be dropped transmissively between the first port and the third port, reflects other wavelengths from the first port to the second port for further amplification, and reflects wavelengths from the fourth port to the third port for combination with the dropped wavelength.

In some embodiments, the wavelength 1550±6.5 nm is dropped by a first four port add-drop multiplexer after a first segment of the plurality of amplification media segments, the wavelengths 1570±6.5 nm and 1590±6.5 nm are dropped after a second segment of the plurality of amplification media segments by second and third four port add-drop multiplexers, and the wavelength 1610±6.5 nm is dropped after a third of the plurality of amplification media segments.

According to another broad aspect, the invention provides an apparatus for amplifying a multi-wavelength optical input, the apparatus comprising: a plurality of erbium doped fiber lengths; a plurality of multi-port optical add-drop multiplexers; a plurality of optical power splitters; a plurality of wavelength couplers; a N:1 optical multiplexer; and at least one pump laser for supplying pump laser energy, wherein the multi-wavelength optical input is amplified by a first amplification stage comprising a first wavelength coupler, a first length of erbium doped fiber and passed to a first multi-port optical add-drop multiplexer, the first wavelength coupler combines the multi-wavelength optical input with a first pump laser energy supplied by the at least one pump laser, the first length of erbium doped fiber amplifies the multi-wavelength optical input and inputs an amplified multi-wavelength optical input to a first input port of the first multi-port optical add-drop multiplexer, wherein an amplified first wavelength of the amplified multi-wavelength optical input is dropped to a first output port of the first multi-port optical add-drop multiplexer, the amplified first wavelength being supplied to a first input port of a N:1 optical multiplexer and remaining amplified wavelengths comprising the amplified multi-wavelength optical input minus the amplified first wavelength are passed to a second amplification stage via a second output port of the first multi-port optical add-drop multiplexer, the remaining amplified wavelengths are further amplified by a second amplification stage comprising a second wavelength coupler, a second length of erbium doped fiber and a second multi-port optical add-drop multiplexer, the second wavelength coupler combines the remaining amplified wavelengths with a second pump laser energy supplied by the at least one pump laser, the second length of erbium doped fiber further amplifies the remaining amplified wavelengths and inputs remaining further amplified wavelengths to a first input port of the second multi-port optical add-drop multiplexer, wherein an amplified second wavelength of the remaining further amplified wavelengths is dropped to a first output port of the second multi-port optical add-drop multiplexer, the amplified second wavelength being supplied to a second input port of the N:1 optical multiplexer and remaining twice amplified wavelengths comprising the remaining further amplified wavelengths minus the amplified second wavelength are passed to a third multi-port optical add-drop multiplexer via a second output port of the second multi-port optical add-drop multiplexer, the remaining twice amplified wavelengths are supplied to a first input port of the third multi-port optical add-drop multiplexer, wherein an amplified third wavelength of the remaining twice amplified wavelengths is dropped to a first output port of the third multi-port optical add-drop multiplexer, the amplified third wavelength being supplied to a third input port of the N:1 optical multiplexer and a last remaining twice amplified wavelength consisting of a fourth wavelength is passed to a third amplification stage via a second output port of the third multi-port optical add-drop multiplexer, the fourth wavelength is amplified by the third amplification stage comprising a third wavelength coupler, a third length of erbium doped fiber and a fourth multi-port optical add-drop multiplexer, the third wavelength coupler combines the fourth wavelength with a third pump laser energy supplied by the at least one pump laser, the third length of erbium doped fiber amplifies the fourth wavelength and inputs an amplified fourth wavelength to a first input port of the fourth multi-port optical add-drop multiplexer, wherein the amplified fourth wavelength is supplied by a first output of the fourth multi-port optical add-drop multiplexer to a fourth input port of the N:1 optical multiplexer, the amplified first, amplified second, amplified third, and amplified fourth wavelengths are input to and combined by the N:1 optical multiplexer to generate a multi-wavelength optical output which has a substantially flat gain; and the at least one pump laser and the plurality of power splitters generate the first, second and third pump laser energies for the first, second and third erbium doped fiber lengths, respectively.

In some embodiments, the plurality of multi-port optical add-drop multiplexers have at least 3 ports.

In some embodiments, the apparatus further comprises a noise suppression filter after the third erbium doped fiber length an output of which is supplied to the N:1 optical multiplexer.

In some embodiments, the wavelengths occupy wavelength ranges centred at 1550 nm, 1570 nm, 1590 nm, and 1610 nm.

According to another broad aspect, the invention provides an apparatus for amplifying a multi-wavelength optical input, the apparatus comprising: a plurality of erbium doped fiber lengths; a plurality of multi-port optical add-drop multiplexers; a plurality of optical power splitters; a plurality of wavelength couplers; at least one NSF; and at least one pump laser for supplying pump laser energy, wherein the multi-wavelength optical input is amplified by a first amplification stage comprising a first wavelength coupler, a first length of erbium doped fiber and a first multi-port optical add-drop multiplexer, the first wavelength coupler combines the multi-wavelength optical input with a first pump laser energy supplied by the at least one pump laser, the first length of erbium doped fiber amplifies the multi-wavelength optical input and inputs an amplified multi-wavelength optical input to a first input port of the first multi-port optical add-drop multiplexer, wherein an amplified first wavelength of the amplified multi-wavelength optical input is combined with a first amplified multi-wavelength optical signal comprising amplified second, amplified third and amplified fourth wavelengths output from a second amplification stage and input at a second input port of the first multi-port optical add-drop multiplexer, a combined amplified multi-wavelength optical signal of the amplified first, the amplified second, the amplified third and the amplified fourth wavelengths output at a first output port of the first multi-port optical add-drop multiplexer and remaining amplified wavelengths comprising the amplified multi-wavelength optical input minus the amplified first wavelength are passed to the second amplification stage via a second output port of the first multi-port optical add-drop multiplexer, the remaining amplified wavelengths are further amplified by the second amplification stage comprising a second wavelength coupler, a second length of erbium doped fiber and a second multi-port optical add-drop multiplexer, the second wavelength coupler combines the remaining amplified wavelengths with a second pump laser energy supplied by the at least one pump laser, the second length of erbium doped fiber further amplifies the remaining amplified wavelengths and supplies remaining further amplified wavelengths to a first input port of the second multi-port optical add-drop multiplexer, wherein an amplified second wavelength of the remaining further amplified wavelengths is combined with a second amplified multi-wavelength optical signal comprising the amplified third and the amplified fourth wavelengths output from a third multi-port optical add-drop multiplexer and input at a second input port of the second multi-port optical add-drop multiplexer, the first amplified multi-wavelength optical signal comprising the amplified second, the amplified third and the amplified fourth wavelengths output at a first output port of the second multi-port optical add-drop multiplexer and remaining twice amplified wavelengths comprising the remaining further amplified wavelengths minus the amplified second wavelength are passed through a second output port of the second multi-port optical add-drop multiplexer to a third multi-port optical add-drop multiplexer, the remaining twice amplified wavelengths are supplied to a first input port of the third multi-port optical add-drop multiplexer, wherein an amplified third wavelength of the remaining twice amplified wavelengths is combined with the amplified fourth wavelength output from the third amplification stage and input at a second input port of the third multi-port optical add-drop multiplexer, the second amplified multi-wavelength optical signal comprising the amplified third and the amplified fourth wavelengths output at a first output port of the third multi-port optical add-drop multiplexer and a last remaining twice amplified wavelength consisting of a fourth wavelength is passed to a third amplification stage via a second output port of the third multi-port optical add-drop multiplexer, the fourth wavelength is amplified by the third amplification stage comprising a third wavelength coupler, a third length of erbium doped fiber and an ASE NSF, the third wavelength coupler combines the fourth wavelength with a third pump laser energy supplied by the at least one pump laser, the third length of erbium doped fiber amplifies the fourth wavelength and inputs the amplified fourth wavelength to an input of the noise suppression filter and the amplified fourth wavelength output from the ASE NSF is supplied to the second input port of the third multi-port optical add-drop multiplexer, the combined amplified multi-wavelength optical signal of the amplified first, the amplified second, the amplified third and the amplified fourth wavelengths output from the first output port of the first multi-port optical add-drop multiplexer is a multi-wavelength optical output which has a substantially flat gain; and the at least one pump laser and the plurality of power splitters generate the first, second and third pump laser energies for the first, second and third erbium doped fiber lengths, respectively.

In some embodiments, the NSF is a fused-fiber device or a thin film device.

In some embodiments, the plurality of multi-port optical add-drop multiplexers have at least 4 ports, a $4^{th}$ port being the add port.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

A key component of cost reduction in coarse wavelength division multiplexing (CWDM) systems is a use of lasers that do not require control systems for maintaining narrow transmission wavelengths. Without such control systems, the wavelength of a laser used for transmission, typically a distributed feedback (DFB) laser, can vary by as much as 6.5 nanometers (nm) on either side of a specified transmission wavelength resulting in a total potential transmission wavelength variation of 13 nm over the expected variation in operating temperature.

Erbium doped fiber (EDF) has a gain response that is relatively flat (±5 db) in the C-band. Therefore, if the specified transmission wavelength varies within 13 nm as described above, a transmission power measured at an output of a length of EDF will vary within a limited acceptable range, for example within 5 dB. Outside of the C-band, specifically in the L-band where the gain response is less flat, a variation in wavelength up to 13 nm will cause a variation in the transmission power of more than 10 db.

Figure 1:
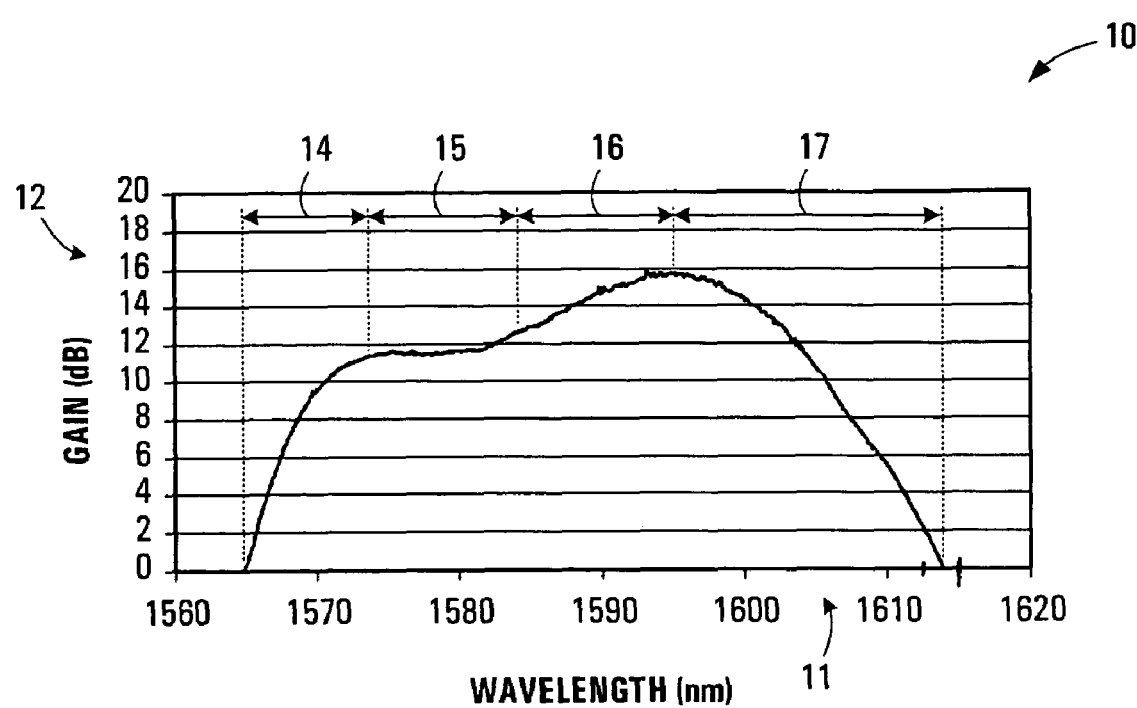
FIG. 1 is a plot of gain response versus wavelength for a wavelength range of 1560 nm to 1620 nm for a conventional L-band amplifier.

FIG. 1 is a plot of gain response versus wavelength 10 in the wavelength range of 1565 nm to 1615 nm for a conventional erbium doped fiber amplifier (EDFA) operating in the L-band of the spectrum. The x-axis 11 displays a wavelength variable in nanometers (nm) starting at 1560 nm and ending at 1620 nm. The y-axis 12 displays a gain variable in decibels (dB). Between approximately 1565 nm and 1573 nm the gain response has a steep positive, or increasing, gain slope 14. Between approximately 1573 nm and 1583 nm the gain response is substantially flat 15. Between approximately 1583 nm and 1595 nm the gain response has a shallow positive slope 16. Between approximately 1595 nm and 1614 nm the gain response has a steep negative, or decreasing, gain slope 17. There is a 16 dB variation in the gain response within the wavelength range of 1565 nm to 1614 nm as shown in FIG. 1.

A gain flattening filter is a type of filter that can be used to compensate for a gain response that is not substantially flat. The gain flattening filter can typically only provide a maximum gain that is equal to a minimum gain within the wavelength range that is desired to be substantially flat. As a result, there is a practical limit to the scale of gain response that can be compensated. Currently, there is no cost-effective gain flattening single filter which can correct a 16 dB variation in gain response which occurs within a wavelength range such as 1595 nm to 1614 nm shown in FIG. 1.

Figure 2:
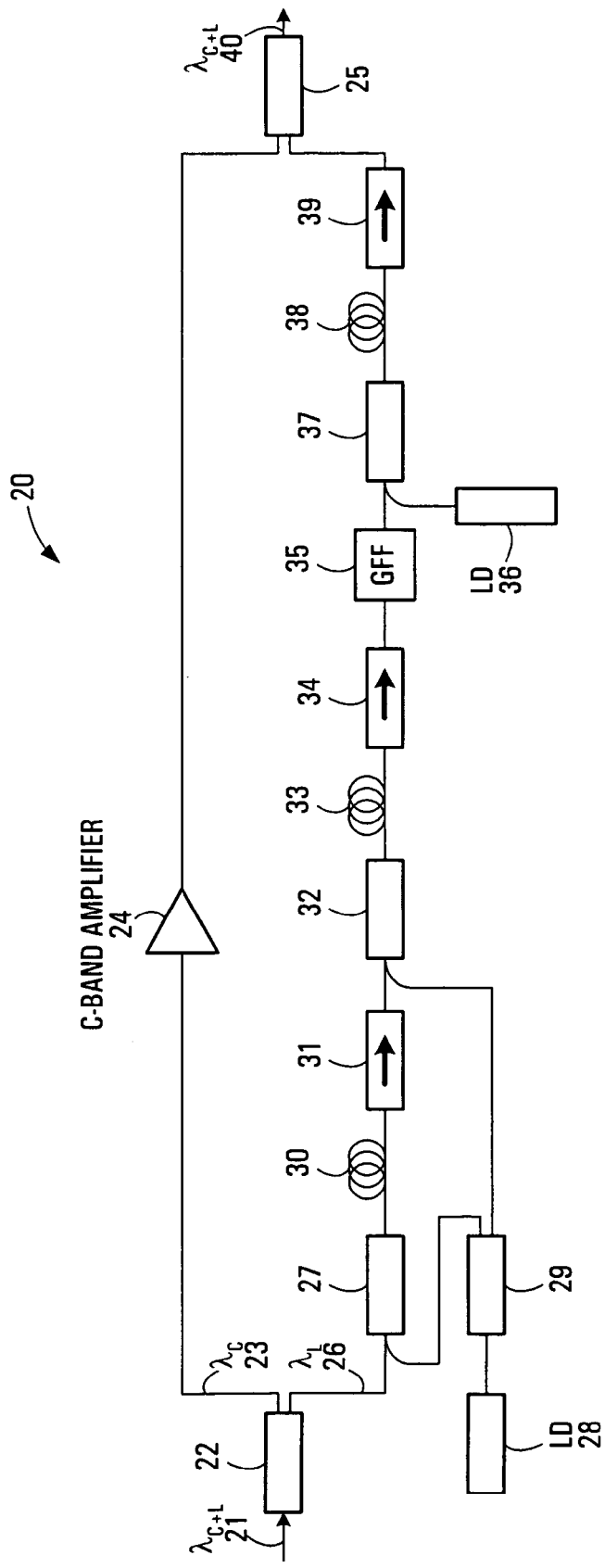
FIG. 2 is a schematic diagram of a conventional wideband C-band plus L-band wavelength optical amplifier.

FIG. 2 shows an example of an optical amplifier 20 for amplifying a C-band plus L-band wavelength range. An input 21 to the conventional optical amplifier 20 is an input to a two band splitter 22. The two band splitter 22 has two outputs resulting in two separate component paths. A first component path follows a first output port 23 which is connected to an input of a C-band amplifier 24. An output of the C-band amplifier 24 is connected to a first input port of a two band combiner 25.

A second component path follows a second output port 26 from the two band splitter 22 which is connected to a first input port of a first wavelength coupler 27. A first pump laser 28 is connected to a tap coupler 29, which has two output ports. A first output port of the tap coupler 29 is connected to a second port of the first wavelength coupler 27. An output port of the first wavelength coupler 27 is connected to a first length of erbium doped fiber (EDF) 30. The first length of EDF 30 is connected to an input of a first optical isolator 31. An output of the first optical isolator 31 is connected to a first input port of a second wavelength coupler 32. A second output port of the tap coupler 29 is connected to a second input port of the second wavelength coupler 32. An output of the second wavelength coupler 32 is connected to a second length of EDF 33. The second length of EDF 33 is connected to an input of a second optical isolator 34. An output of the second optical isolator 34 is connected to an input of a gain flattening filter 35. An output of the gain flattening filter 35 is connected to a first input port of a third wavelength coupler 37. A second pump laser 36 is connected to a second input port of the third wavelength coupler 37. An output of the third wavelength coupler 37 is connected to a third length of EDF 38 which is subsequently connected to a third optical isolator 39. An output of the third optical isolator 39 is connected to a second input port of the two band combiner 25. The first and second component paths meet at the two band combiner 25. An output of the two band combiner 25 is a resulting output 40 of the conventional optical amplifier 20.

In operation, the optical amplifier 20 of FIG. 2 is supplied with a multi-wavelength optical input. The two band splitter 22 serves a purpose of dividing the multi-wavelength optical input into two separate wavelength bands, a C-band wavelength band and an L-band wavelength band. The C-band wavelength band is supplied to the C-band amplifier 24 where all wavelengths of the C-band wavelength band undergo amplification. The amplified C-band wavelength band output from the C-band amplifier 24 is supplied to the first input port of the two band combiner 25.

The L-band wavelength band output from the second port 26 of the two band splitter 22 is supplied to the first input port of the first wavelength coupler 27. The first pump laser 28 and the power splitter 29 supply a first laser pump energy to the second input port of the first wavelength coupler 27. The first wavelength coupler 27 combines the L-band wavelength band and the first laser pump energy. The L-band wavelength band is amplified by the first length of EDF 30. The first optical isolator 31 serves to increase pump efficiency and reduce the NF.

The amplified L-band wavelength band is further amplified by combining a second pump laser energy with the amplified L-band wavelength band using the second wavelength coupler 32. The second laser pump energy is supplied to the second input port of the second wavelength coupler 32 from the first pump laser 28 via the second output port of the power splitter 29. The second length of EDF 33 and a second optical isolator 34 operate in a similar manner to the first length of EDF 30 and the first optical isolator 31.

The gain flattening filter 35 receives a twice amplified L-band wavelength band output from the second optical isolator 34 and uses that output to create a substantially flat gain response for the twice amplified L-band wavelength band. The twice amplified L-band wavelength band with substantially flat gain response is input to the first input port of the third wavelength coupler 37. A third laser pump energy is supplied to the second input port of the third wavelength coupler 37 from the second pump laser 36. The twice amplified L-band wavelength band with substantially flat gain response is amplified by the third length of EDF 38. A treble amplified L-band wavelength band with substantially flat gain response is output from the optical isolator 39 and supplied to the second input port of the two band combiner 25, assuming the GFF 35 pre-compensates for the effect of the last length of EDF.

The two band combiner 25 recombines the amplified C-band wavelength band and the treble amplified L-band wavelength band and creates the resulting output 40 of the conventional optical amplifier 20 that has a substantially flat response.

In the case of the conventional optical amplifier 20, two pump lasers 28, 36 are required to provide sufficient pump energy for amplification of all wavelengths in the L-band wavelength band. Also, an expensive gain flattening filter 35 is required to create a gain response that is substantially flat in the L-band wavelength band. Also, this design does not provide adequate performance in the 1563-1570 nm and 1610-1617 nm ranges. This makes the design of FIG. 2 inappropriate for CWDW applications.

Figure 3:
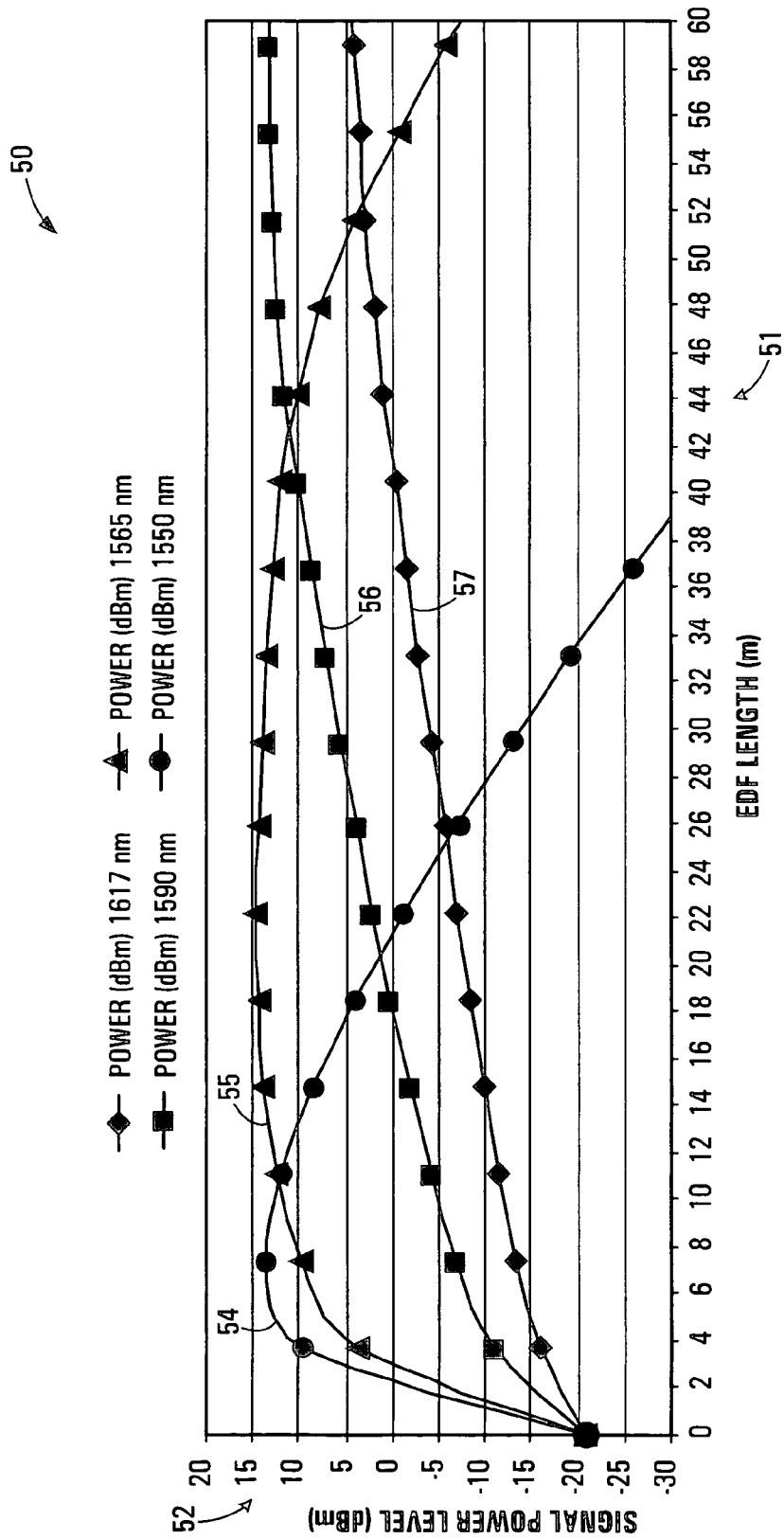
FIG. 3 is a plot of signal power versus physical length of erbium doped fiber for four CWDM channels at the wavelength ranges of 1550±7 nm, 1570±7 nm, 1590±7 nm, 1610±7 nm for a given pump energy injected into the fiber.

FIG. 3 shows a plot of optical signal power versus physical length of EDF characteristic 50 for several wavelengths of light at a given pump level. The x-axis 51 displays a distance variable denoting a physical length of EDF in meters (m) starting at 0 m and ending at 60 m. The y-axis 52 displays a power-level variable in dBms. The input power supplied at 0 m to the EDF is −20 dBm in all cases. A wavelength of light at 1550 nm is shown to have a response curve 54 that increases in power to a maximum of approximately 13.5 dBm at a physical length of approximately 8 m and then slowly decreases in power as fiber length continues to increase. A wavelength of light at 1565 nm is shown to have a response curve 55 that increases in gain to a maximum of approximately 15 dBm at a physical length of approximately 24 m and then slowly decreases in power as fiber length continues to increase. A wavelength of light at 1590 nm is shown to have a response curve 56 that slowly increases in power to a maximum of approximately 14 dBm at a physical length of approximately 60 m. A wavelength of light at 1617 nm is shown to have a response curve 57 that slowly increases in power to a maximum of approximately 5 dBm at a physical length of approximately 60 m.

Embodiments of the invention exploit the gain versus physical length of EDF characteristic seen in FIG. 3 to provide C-band and L-band wavelength range signal amplification with a substantially flat gain for a multi-wavelength optical input. For example by using EDF to amplify the multi-wavelength optical input and dropping different wavelengths at different physical lengths of EDF it is possible to achieve a substantially flat gain response over a significant portion of the CWDM wavelengths. Add-drop multiplexers are an example of a mechanism that might be employed to drop one or more wavelengths subsequent to each length of EDF. One skilled in the art will appreciate that alternative mechanisms for dropping one or more wavelengths might he employed in some embodiments.

For example, in some embodiments, wavelengths in a first wavelength range, have a substantially flat gain response when amplified by a length of EDF. One or more wavelengths in this range are dropped following a specific length of erbium doped fiber. Additional physical lengths of EDF are concatenated in series to form an overall length of EDF so as to exploit the gain versus physical length of EDF characteristic. Individual or multiple wavelengths outside the first wavelength range are dropped from the overall length of EDF at respective specific lengths so as to provide a gain response for the individual or multiple wavelengths, which is substantially the same as the substantially flat gain response of the one or more wavelengths first wavelength range.

In some embodiments, one or more of the individual or multiple wavelengths outside the first wavelength range are further processed to enhance gain flatness.

In a particular embodiment of the invention EDF is a medium used to provide optical amplification to an input optical signal when combined with a pump laser energy. More generally, any type of optical fiber or optical amplification media can be used which provides optical amplification to an input optical signal when combined with a pumping energy. For example, the amplification medium may be in the form of planar wave guide.

Figure 4:
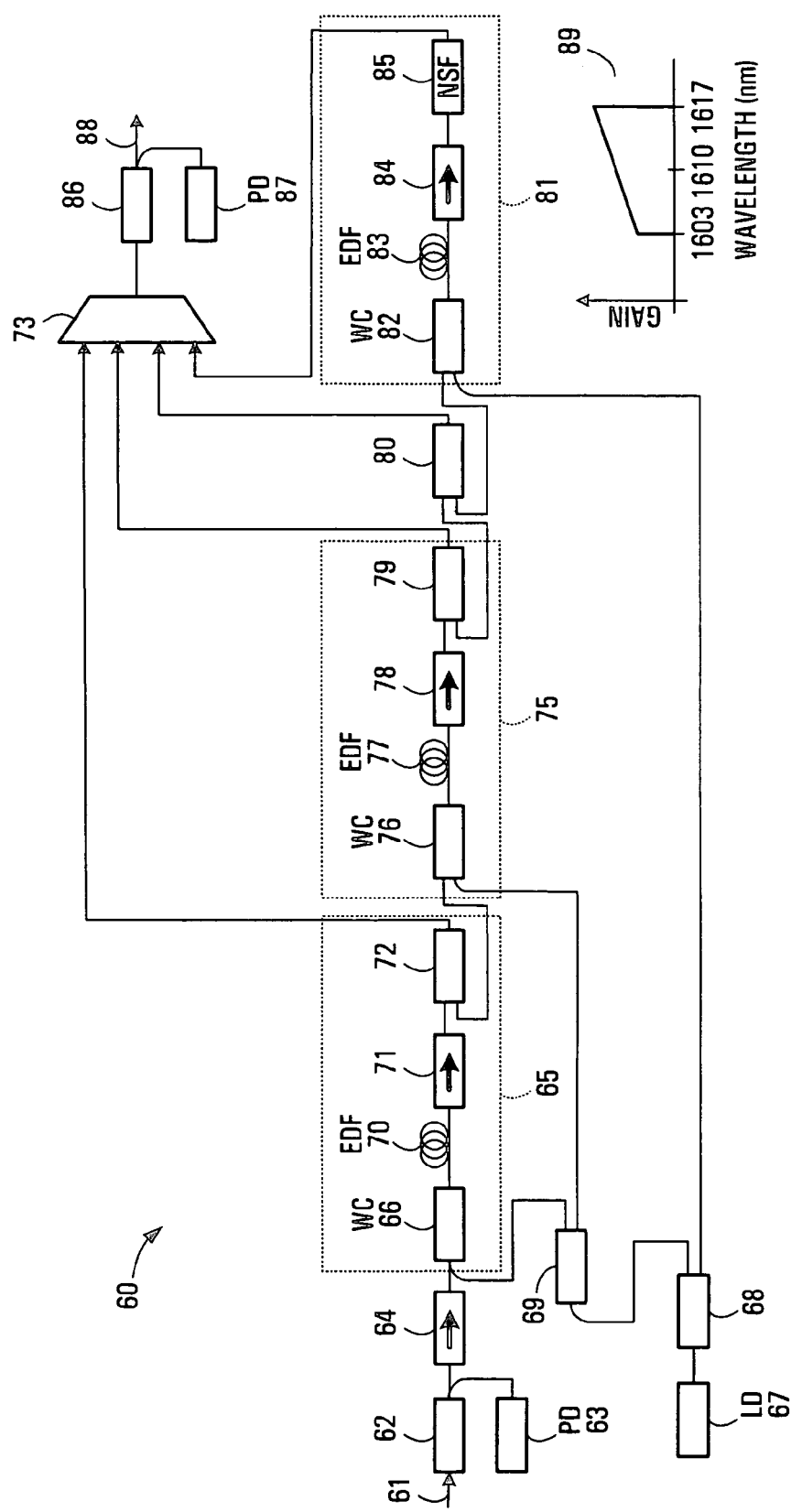
FIG. 4 is a schematic diagram of a red-band wavelength amplifier provided by an embodiment of the invention.

FIG. 4 illustrates an example embodiment provided by the invention. The optical amplifier 60 has an input 61 which is an input of a first tap coupler 62. The first tap coupler 62 has two output ports. A first output port is connected to an input of a first optical isolator 64. A second output port is connected to a first photodetector 63. An output of the first optical isolator 64 is connected to a first amplification stage 65.

The first amplification stage 65 comprises a first wavelength coupler 66, a first length of EDF 70, a second optical isolator 71, and a first multi-port optical add-drop multiplexer 72. An output of the first optical isolator 64 is connected to a first input port of the first wavelength coupler 66. A pump laser 67 is connected to an input port of a second tap coupler 68. A first output port of the second tap coupler 68 is connected to an input port of a third tap coupler 69. A first output port of the third tap coupler 69 is connected to a second input port of the first wavelength coupler 66. The output of the first wavelength coupler 66 is connected in series with the first length of EDF 70 and the second optical isolator 71. An output of the second optical isolator 71 is connected to a first input port of the first multi-port optical add-drop multiplexer 72. A first output port of the first multi-port optical add-drop multiplexer 72 is connected to a first input port of a N:1 optical multiplexer 73. A second output port of the first multi-port optical add-drop multiplexer 72 is connected to a second amplification stage 75.

The second amplification stage 75 comprises a second wavelength coupler 76, a second length of EDF 77, a third optical isolator 78, and a second multi-port optical add-drop multiplexer 79. The components 76, 77, 78, 79 of the second amplification stage 75 are connected in a similar manner as comparable components of the first amplification stage 65. The second output port of the first multi-port optical add-drop multiplexer 72 is connected to the first port of the second wavelength coupler 76. A second output port of the third tap coupler 69 is connected to a second input port of the second wavelength coupler 76. A first output port of the second multi-port optical add-drop multiplexer 79 is connected to a second input port of the N:1 optical multiplexer 73. A second output port of the second multi-port optical add-drop multiplexer 79 is connected to a first input port of a third multi-port optical add-drop multiplexer 80.

A first output port of the third multi-port optical add-drop multiplexer 80 is connected to a third input port of the N:1 optical multiplexer 73. A second output port of the third multi-port optical add-drop multiplexer 80 is connected to a third amplification stage 81.

The third amplification stage 81 comprises a third wavelength coupler 82, a third length of EDF 83, a fourth optical isolator 84, and a noise suppression filter (NSF) 85. The components 82, 83, 84, of the third amplification stage 81 are connected in a similar manner as comparable components of the first and second amplification stages 65, 75. The second output port of the third multi-port optical add-drop multiplexer 80 is connected to the first input port of the third wavelength coupler 82. A second output port of the second tap coupler 68 is connected to a second input port of the third wavelength coupler 82. An output of NSF 85 is connected to a fourth input port of the N:1 optical multiplexer 73.

The output of the N:1 optical multiplexer 73 is connected to a fourth tap coupler 86. A first output port of the fourth tap coupler 86 is an output 88 from the optical amplifier 60. A second output port of the fourth tap coupler 86 is connected to a second photodiode 87.

In operation, the example embodiment of the optical amplifier 60 shown in FIG. 4 is supplied with a multi-wavelength optical input at the input 61. The first tap coupler 62 and the first photodetector 63 serve to allow power monitoring of the multi-wavelength optical input. The multi-wavelength optical input is amplified by the first amplification stage 65.

The first wavelength coupler (WC) 66 combines the multi-wavelength optical input with a first pump laser energy supplied from the pump laser 67 via first and second tap couplers 68, 69. The multi-wavelength optical input which is amplified by the first length of EFD 70 is then supplied to the second optical isolator 71. The amplified multi-wavelength optical input which is output from the second optical isolator 71 is supplied to the first input port of a first multi-port optical add-drop multiplexer 72, wherein an amplified first wavelength of the amplified multi-wavelength optical input is dropped to the first output port of the first multi-port optical add-drop multiplexer 72. The amplified first wavelength is output from the first output port of the first multi-port optical add-drop multiplexer 72 to the N:1 optical multiplexer 73. Remaining amplified wavelengths comprising the amplified multi-wavelength optical input minus the amplified first wavelength are passed to the second amplification stage 75 via the second output port of the first multi-port optical add-drop multiplexer 72.

The remaining amplified wavelengths are combined with a second pump laser energy using the second wavelength coupler 76. The second pump laser energy is supplied from the pump laser 67 via the first output port of the second tap coupler 68 and the second output port of the third tap coupler 69. The remaining amplified wavelengths and the second pump laser energy are input to the second length of EDF 77.

The remaining amplified wavelengths are further amplified by the second length of EDF 77 and are supplied to the third optical isolator 78. The third optical isolator 78 protects the pump laser 67 and transmission lasers from backward ASE. An output of the optical isolator 78 is input to a first input port of the second multi-port optical add-drop multiplexer 79. An amplified second wavelength of remaining further amplified wavelengths is dropped to the first output port of the second multi-port optical add-drop multiplexer 79. The amplified second wavelength is then input to the second input port of the N:1 optical multiplexer 73. Remaining twice amplified wavelengths comprising the remaining further amplified wavelengths minus the amplified second wavelength are passed through the second output port of the second multi-port optical add-drop multiplexer 79 and input to the first input port of the third multi-port optical add-drop multiplexer 80.

An amplified third wavelength of the remaining twice amplified wavelengths input to the first input port of the third multi-port optical add-drop multiplexer 80 is dropped to the first output port of the third multi-port optical add-drop multiplexer 80. The amplified third wavelength is input to the third input port of the N:1 optical multiplexer 73. A last remaining twice amplified wavelength, consisting of a fourth wavelength, is passed to the third amplification stage 81 via the second output port of the third multi-port optical add-drop multiplexer 80.

The fourth wavelength is combined with a third pump laser energy using the third wavelength coupler 82. The third pump laser energy is supplied from the pump laser 67 via the second output port of the second tap coupler 68. The fourth wavelength and the third pump laser energy are supplied to the third length of EDF 83.

The fourth remaining wavelength is amplified by the third length of EDF 83 and is input to the fourth optical isolator 84. The optical isolator 84 supplies the amplified fourth wavelength to a noise suppression filter (NSF) 85. The amplified fourth wavelength is supplied to the fourth input port of the N:1 optical multiplexer 73 from the NSF 85.

The amplified first, amplified second, amplified third, and amplified fourth wavelengths are input to and combined by the N:1 optical multiplexer 73 to generate a multi-wavelength optical output which has a substantially flat gain.

The first output port of the fourth tap coupler 86 is the output 88 for the optical amplifier 60. The second output port of the fourth tap coupler 86 and the second photodetector 87 are used to monitor optical power of the multi-wavelength optical output supplied by the N:1 optical multiplexer 73.

In a preferred embodiment, the first tap coupler 62 is a 5/95 tap that supplies 5 percent of input power to the first photodetector 63. More generally, the first tap coupler 62 can supply any desired percentage of tap power to the first photodetector 63. In some embodiments where power monitoring is not required, there is no first tap coupler 62 and no first photodetector 63.

In some embodiments the first photodetector 63 is a PIN photodiode or an avalanche photodiode. In some embodiments, the first photodetector 63 has a wideband spectral response that can detect wavelengths in the C and L-bands. More generally, the first photodetector 63 is any device that can detect optical power within an appropriate wavelength range.

In some embodiments, the first optical isolator 64 may not be required.

In some embodiments, a single laser is used to supply pump laser energy to all lengths of EDF. In other embodiments multiple lasers could be used, where one laser supplies pump laser energy for a single length of EDF or several lengths of EDF and other lasers behave in a similar way. More generally, the pump laser energy generated by the pump laser or pump lasers is supplied to any form of optical amplification media.

In some embodiments the pump laser 67 is a 980 nm wavelength pump laser. In other embodiments the pump laser 67 is a 1480 nm wavelength pump laser. In embodiments where more than one pump laser is used, the pump lasers may be a combination of 980 nm or 1480 nm wavelength pump lasers. Lasers at nominal wavelength of 975 nm are also appropriate and readily available. More generally, the pump laser wavelength can be any wavelength that allows suitable optical amplification in the optical amplification media.

In a preferred embodiment, the second tap coupler 68 is a 70/30 tap that supplies 70 percent of input power from the pump laser 67 to the third tap coupler 69 and 30 percent of the input power from the pump laser 67 to the third wavelength coupler 82. More generally, the second tap coupler 68 can supply any desired ratio of tap power to the third tap coupler 69 and the third wavelength coupler 82. In some embodiments where each optical amplification media segment is pumped by a pump laser which pumps only that one optical amplification media segment the second tap coupler 68 is not required.

In a preferred embodiment, the third tap coupler 69 is a 60/40 tap that supplies 60 percent of input power to the first wavelength coupler 66 and 40 percent of the input power to the second wavelength coupler 76. More generally, the third tap coupler 69 can supply any desired ratio of tap power to the first wavelength coupler 66 and the second wavelength coupler 76. In some embodiments where each optical amplification media segment is pumped by a pump laser which pumps only that one optical amplification media segment the third tap coupler 69 is not required.

More generally, any number of tap couplers such as the second tap coupler 68 and the third tap coupler 68 are used as required depending on a desired number of pump lasers, a desired number of optical amplification media segments, and how pump laser energy is supplied to the desired number of optical amplification media segments from the desired number of pump lasers.

In the example embodiment, the first wavelength coupler 66, the second wavelength coupler 76 and the third wavelength coupler 82 are shown as three port couplers that combine the pump laser energy wavelength and a multi-wavelength signal. In other embodiments, the first wavelength coupler 66, the second wavelength coupler 76 and the third wavelength coupler 82 are multi-port couplers comprising at least two input ports and at least one output port. For example, a four port coupler could be used, but the extra port would be idle.

More generally, any number of wavelength couplers such as the first wavelength coupler 66, the second wavelength coupler 76 and the third wavelength coupler 82 can be used in an optical amplifier provided by an embodiment of the invention depending on a desired number of optical amplification media segments used in the optical amplifier, and the number of wavelength channels to drop after each segment. In the example of FIG. 4, one wavelength channel is dropped after the first segment 70, two wavelength channels are dropped after the second segment 77, and a single wavelength channel goes on to be amplified by the last segment 83. In the example, two couplers 79, 80 are used to drop the two wavelengths after the second segment 77. This function may alternatively be achieved with a single couplers. More generally, depending on a given application, different numbers of segments may be employed, with an appropriate number of wavelength channels (one or more) dropped after each segment. The invention is particularly suited for CWDM red band wavelengths. However, other embodiments of the invention may be adapted to handle other bands.

For example, this technology is also used to amplify the 1530 nm CWDM wavelengths in another embodiment. Typically, the rest of the S-band CWDM wavelengths can be handled by a conventional S-band amplifier.

In a simplified example embodiment, which applies the gain versus physical length of erbium doped fiber information shown in FIG. 3, including the use of a −20 dBm input power as an input to the example embodiment of FIG. 4, the first length of erbium doped fiber 70 is approximately 3 m long, which provides a 1550 nm wavelength a gain of approximately 27 dB. The second length of erbium doped fiber 77 is approximately 40 m long, which provides a 1565 nm wavelength a gain of approximately 31 dB, and a 1590 nm wavelength a gain of approximately 31 dB. The 1565 nm wavelength has the response curve 55 that intersects the response curve 56 of the 1590 nm wavelength at a position where the gain is 31 dB. This makes the 40 m length of erbium doped fiber, resulting in a total amplifying length of 43 m including the 3 m length of erbium doped fiber used to amplify the 1550 nm wavelength, the ideal length to provide a similar gain to both the 1565 nm wavelength and the 1590 nm wavelength using only a single amplification stage. The third length of erbium doped fiber 83 is approximately 16 m long, resulting in a total amplifying length of 59 m including previous erbium doped fiber lengths, which provides a 1617 nm wavelength a gain of approximately 25 dB.

In other embodiments, the lengths of EDF are variable in length to the extent that a desired amount of gain for a specific wavelength is achieved. More generally, in some embodiments the lengths of EDF used in this example embodiment to amplify an individual wavelength or a band of wavelengths could be replaced with any form of optical amplification media which when pumped by an energy of a different wavelength serves to amplify the individual wavelength or the band of wavelengths.

In some embodiments, the second optical isolator 71, the third optical isolator 78 and the fourth optical isolator 84 are not included in the optical amplifier. In other embodiments, some, but not all of the three optical isolators 71, 78, 84 are present in the optical amplifier. More generally, the second optical isolator 71, the third optical isolator 78 and the fourth optical isolator 84, if used, can be implemented by any type of optical component capable of providing protection from backward ASE generated by an optical amplification process in the optical amplification media.

In the example embodiment of FIG. 4 the N:1 optical multiplexer 73 is a 4:1 optical multiplexer which accepts four inputs and multiplexes them into one output. In other embodiments, the N:1 optical multiplexer 73 can have any desired number of inputs depending on a number of wavelengths that are amplified and required to be recombined. More generally, the N:1 optical multiplexer 73 can be implemented by any type of optical component capable of multiplexing multiple input wavelengths into a single multi-wavelength output.

In a preferred embodiment, the fourth tap coupler 86 is a 1/99 tap that supplies 1 percent of output power to the second photodetector 87. More generally, the fourth tap coupler 86 can supply any desired percentage of tap power to the second photodetector 87. In some embodiments where power monitoring is not required, there is no fourth tap coupler 86 and no second photodetector 87.

In some embodiments the second photodetector 87 is a PIN photodiode or an avalanche photodiode. In some embodiments, the second photodetector 87 has a wideband spectral response that can detect wavelengths in the C and L-bands. More generally, the second photodetector 87 is any device that can detect optical power within an appropriate wavelength range.

Figure 5:
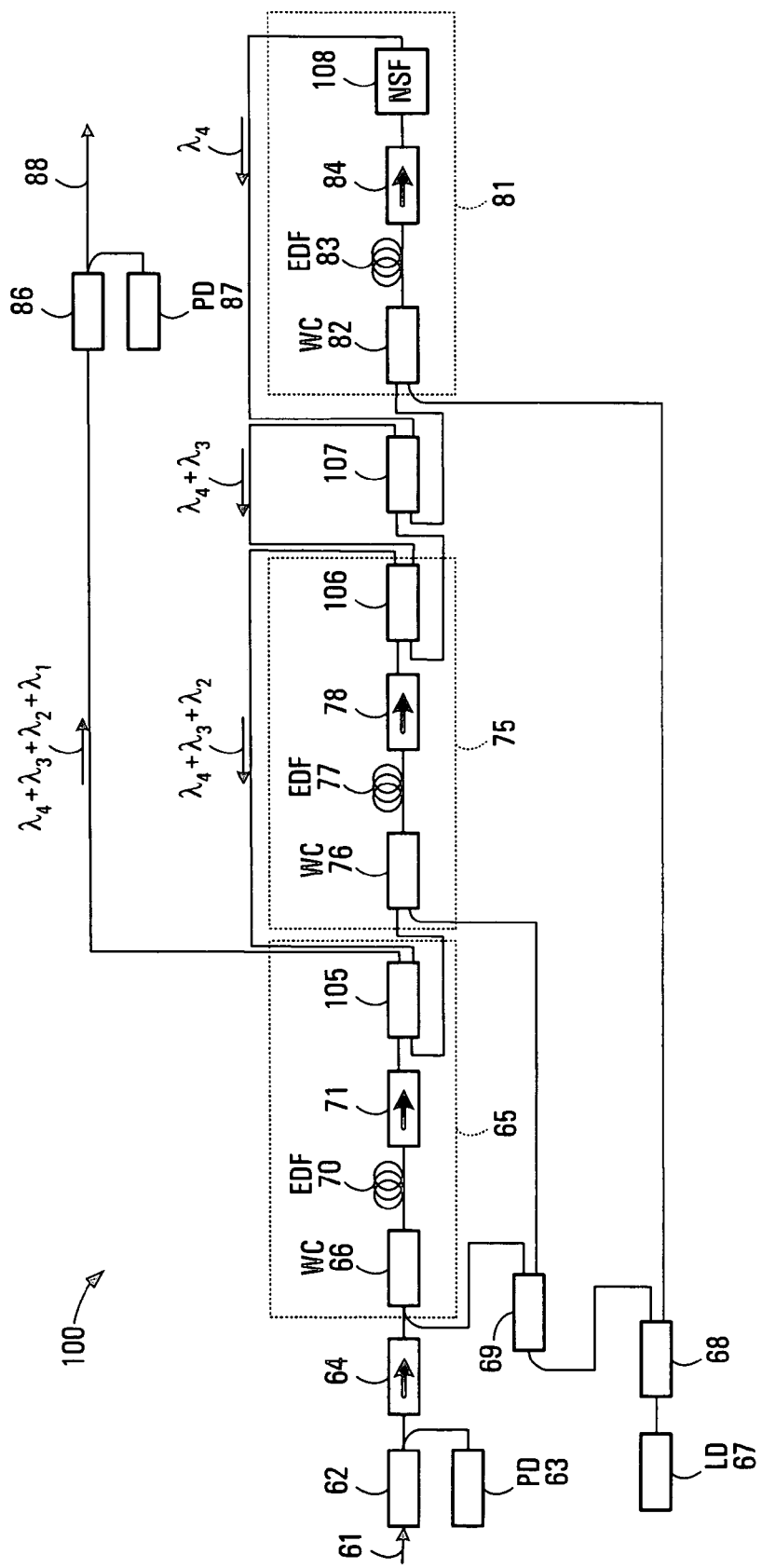
FIG. 5 is a schematic diagram of a red-band wavelength amplifier provided by another embodiment of the invention.
Figure 6:
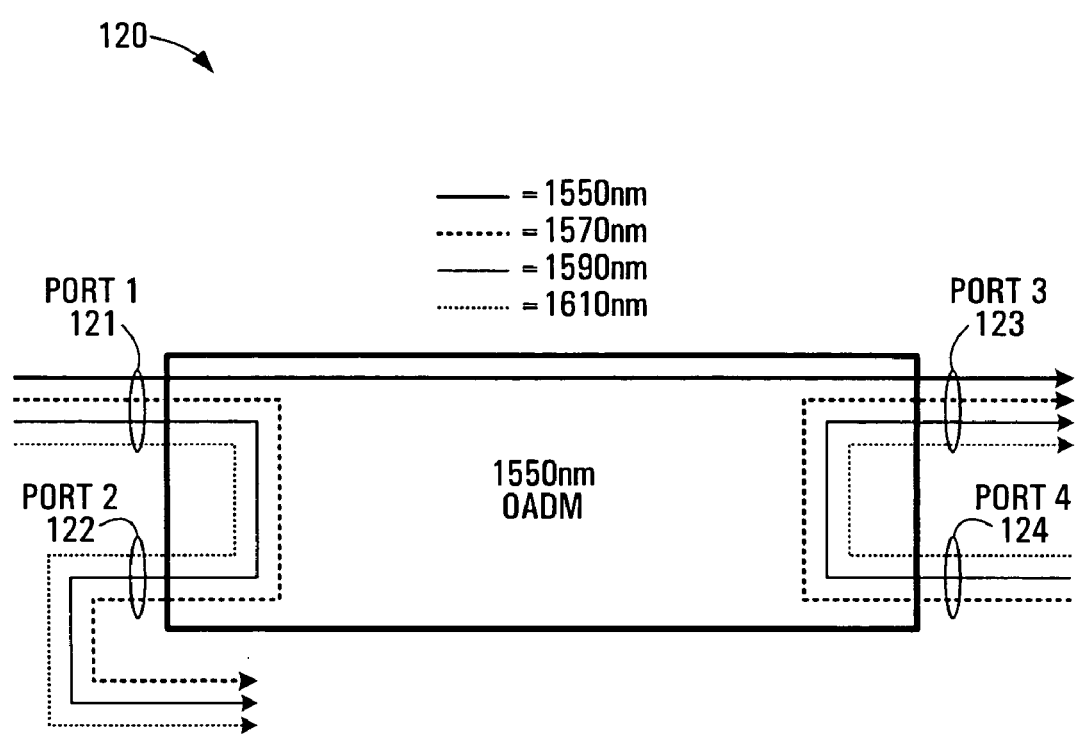
FIG. 6 is a schematic diagram of a four port optical add-drop multiplexer for use in example embodiments of FIG. 4 and FIG. 5.

Shown in FIG. 6 is a four port optical add-drop multiplexer 120 of the type used to implement the first multi-port optical add-drop multiplexer 72 in the example embodiment of FIG. 4 and/or the first multi-port optical add-drop multiplexer 105 of FIG. 5. Port 1 121 is a first input port. Port 2 122 is a first output port. Port 3 123 a second output port. Port 4 124 is a second input port. The four port optical add-drop multiplexer is configured to pass a particular wavelength from port 1 121 through to port 3 123. All other wavelengths received through port 1 121 are reflected back through port 2 122. Similarly, any other wavelengths received at port 4 124 are reflected back through port 3 123. The particular example of FIG. 6 is set up to pass through the 1550 nm wavelength from the port 1 121 to port 3 123, to reflect all other incoming wavelengths back through port 122 which are then redirected onwards to the next amplification segment wavelengths received through port 4 124 are combined with the 1550 nm wavelength passed through from the port 1 121 and output. A different device is employed for each of the add drop multiplexers because different wavelengths are to be dropped by each device.

The NSF 85 generally can be any component which enhances the noise figure for the wavelength amplified in segment 83. It is noted that additional NSFs may be implemented in other amplifier sections, but generally these would not be required because adequate noise suppression can be achieved without this. The NSF 85 can be designed to have an additional transmission characteristic which is approximately the opposite to that of the EDF gain characteristic of FIG. 1 within the range of the last wavelength channel, namely from 1603 nm to 1617 nm, and has as small a transmission characteristic as possible outside this range. An example of such a transmission characteristic is indicated at 89. At 1603 nm, where the gain characteristic of FIG. 1 for that wavelength range is the largest, the transmission is the smallest. Similarly, at 1617 nm, where the gain characteristic is the smallest (not shown in FIG. 1), the transmission is the largest.

The NSF 85 achieves an important objective. It can be seen from FIG. 1 that in the wavelength range of interest, the response of EDF has about a 10 dB swing. While this may be acceptable for some applications, it is preferable to further flatten the response within this range. A NSF as described above achieves this. The NSF 85 filters all the ASE contributions of all the amplifying segments.

In operation, a multi-wavelength input is supplied to the Port 1. A 1550 nm wavelength of the multi-wavelength input is passed through the four port optical add-drop multiplexer 120 to Port 3 123. All wavelengths except the 1550 nm wavelength go to Port 2 122. Additional wavelengths, other than another 1550 nm wavelength, input at Port 4 124 are combined with the 1550 nm wavelength input at Port 1 121 and a combined output of the 1550 nm wavelength and the additional wavelengths is output at Port 3 123. If no additional wavelengths are input at Port 4 124, only the 1550 nm wavelength is output at Port 3 123. The four port optical add-drop multiplexer 120 can also be used as a three port optical add-drop multiplexer in the example embodiment of FIG. 4. A respective different such add-drop multiplexer is provided for each wavelength to be dropped. If wavelengths are to be dropped together, this can be achieved by concatenating multiple add drop multiplexers, or by providing one with a wider add/drop band.

FIG. 5 illustrates another example embodiment provided by the invention, The example embodiment of FIG. 5 is similar to that of the example embodiment FIG. 4. In the embodiment of FIG. 4, four amplified wavelengths are individually output from the plurality of multi-port optical add-drop multiplexers 72, 79, 80, and the NSF 85 and are combined together again with the N:1 optical multiplexer 73. However, in the embodiment of FIG. 5, the plurality of multi-port optical add-drop multiplexers 105, 106, 107 have a minimum of four ports which allows each multi-port optical add-drop multiplexer to combine a first input from an output of a previous multi-port optical add-drop multiplexer with a second input from an output of a subsequent multi-port optical add-drop multiplexer or a noise suppression filter 108. In this manner four wavelengths can be added in consecutive loopbacks to avoid use of a N:1 optical multiplexer.

For example, the third amplification stage 81 outputs an amplified fourth wavelength, which is input to a second input port of a third multi-port optical add-drop multiplexer 107.

The third multi-port optical add-drop multiplexer 107 outputs a second amplified multi-wavelength optical signal comprising an amplified third and the amplified fourth wavelengths to a second input port of a second multi-port optical add-drop multiplexer 106 in the second amplification stage 75.

The second amplification stage 75 outputs a first amplified multi-wavelength optical signal comprising an amplified second, the amplified third and the amplified fourth wavelengths to a second input port of a first multi-port optical add-drop multiplexer 106 in the first amplification stage 65.

The first amplification stage 65 amplifies a first wavelength and combines it with the first amplified multi-wavelength optical signal output from the second amplification stage comprising the amplified second, the amplified third and the amplified fourth wavelengths. A combined multi-wavelength optical signal comprising an amplified first, the amplified second, the amplified third and the amplified fourth wavelengths is output at a first output port of the first multi-port optical add-drop multiplexer 105.

The noise suppression filter 108 acts to suppress wideband ASE noise while at the same time partially flattens the transmission curve in a wavelength range of 1600 nm to 1617 nm. Therefore, a transmission wavelength will maintain a substantially flat gain response within the 1600 nm to 1617 nm range, even if the transmission wavelength varies when the laser is not controlled.

In some embodiments a gain flattening filter is used in conjunction with a noise suppression filter 108. More generally, in other embodiments any type of optical device capable of compensating an undesirable gain response to produce a substantially flat response and attenuate the ASE can be used in place of the noise suppression filter 108.

In some embodiments a fourth multi-port optical add-drop multiplexer may be used in place of or in conjunction with the noise suppression filter 108.

In some embodiments, the wavelengths being amplified are located on a standard telecommunications grid with a wavelength spacing of substantially 20 nm.

In some embodiments, an optical amplifier can act as a hybrid CWDM/DWDM amplifier. Since a section of the C-band wavelength range gain response is substantially flat due to physical characteristics of EDF many DWDM wavelengths in the C-band wavelength range can be multiplexed onto a fiber, amplified by a length of EDF, dropped subsequent to the length of EDF and demultiplexed using methods known to one skilled in the art. Subsequent segments of EDF perform amplification of L-band wavelengths in similar fashion, or reasonable alternatives, to the embodiments described above.

In some embodiments, DWDM wavelengths used with the hybrid CWDM/DWDM amplifier are located on a standard telecommunications grid with a frequency spacing of substantially 50 GHz, 100 GHz, or 200 GHz.

Numerous modifications and variations of the present invention are possible in light of the above teachings. It is therefore to be understood that within the scope of the appended claims, the invention may be practised otherwise than as specifically described herein.

We claim:
1. An apparatus comprising:
   a plurality of optical amplification media segments which are concatenated in series; wherein subsequent to each optical amplification media segment a respective one or more wavelengths in a respective wavelength range is dropped;

at least one combining element that collectively combine all of the respective one or more wavelengths dropped subsequent to each amplification media segment to produce an amplified wavelength division multiplexed optical signal;

wherein each amplification media segment comprises a fiber amplification media segment;

wherein each particular subsequent concatenated fiber amplification media segment adds an additional physical length of fiber amplification media to the apparatus wherein each particular additional physical length of fiber amplification media is configured such that an overall length of fiber amplification media, including the particular fiber amplification media segment and all preceding physical lengths of fiber amplification media, when supplied with pump laser energy, provide a respective gain response over the respective wavelength range containing the respective one or more wavelengths to be dropped after the particular segment.

2. An apparatus according to claim 1, configured to perform amplification in an overall wavelength range comprising at least 1523 nm to 1617 nm.

3. An apparatus according to claim 1, wherein the wavelengths are located on a standard telecommunications grid with a wavelength spacing of substantially 20 nm.

4. An apparatus according to claim 3, wherein the wavelength ranges are centred at 1550 nm, 1570 nm, 1590 nm, and 1610 nm.

5. An apparatus according to claim 3, wherein the wavelength ranges are centred at 1530 nm, 1550 nm, 1570 nm, 1590 nm, and 1610 nm.

6. An apparatus according to claim 3, wherein the wavelength ranges are 1550±6.5 nm, 1570±6.5 nm, 1590±6.5 nm and 1610±6.5 nm.

7. An apparatus comprising:
a plurality of optical amplification media segments which are concatenated in series; wherein subsequent to each optical amplification media segment a respective one or more wavelengths in a respective wavelength range is dropped;

at least one combining element that collectively combine all of the respective one or more wavelengths dropped subsequent to each amplification media segment to produce an amplified wavelength division multiplexed optical signal;

wherein the wavelengths are located on a standard telecommunications grid with a wavelength spacing of substantially 20 nm;

wherein the wavelength ranges are 1550±6.5 nm, 1570±6.5 nm, 1590±6.5 nm and 1610±6.5 nm;

wherein the wavelength 1550±6.5 nm is dropped after a first segment of the plurality of amplification media segments, the wavelengths 1570±6.5 nm and 1590±6.5 nm are dropped after a second segment of the plurality of amplification media segments, and the wavelength 1610±6.5 nm is dropped after a third of the plurality of amplification media segments.

8. An apparatus according to claim 3, wherein the wavelength ranges are 1530±6.5 nm, 1550±6.5 nm, 1570±6.5 nm, 1590±6.5 nm and 1610±6.5 nm.

9. An apparatus according to claim 2, wherein the apparatus is configured to amplify a plurality of dense wavelength division multiplexed (DWDM) wavelengths in the range 1523 nm to 1670 nm, which are located on a standard telecommunications grid with a frequency spacing of substantially 25 GHz, 50 GHz, 100 GHz, or 200 GHz.

10. An apparatus according to claim 1, wherein the plurality of fiber amplification media segments are collectively supplied with pump laser energy using at least one pump laser.

11. An apparatus according to claim 10, further comprising a plurality of couplers wherein each of the plurality of fiber amplification media segments is supplied with a required level of pump laser energy from the at least one pump laser using at least one of the plurality of couplers to make a gain response for all of the wavelength channels approximately equal.

12. An apparatus according to claim 1, wherein the plurality of fiber amplification media segments are collectively supplied with pump laser energy using only one pump laser.

13. An apparatus according to claim 12, further comprising a plurality of couplers wherein each of the plurality of fiber amplification media segments is supplied with a required level of pump laser energy from the one pump laser using at least one of the plurality of couplers.

14. An apparatus according to claim 1, wherein the plurality of fiber amplification media segments are lengths of erbium doped fiber (EDF).

15. An apparatus according to claim 1, further comprising at least one ASE (amplified spontaneous emission) noise suppression filter (NSF) filtering at least one of the wavelength ranges.

16. An apparatus according to claim 1, wherein after a last of the plurality of amplification media segments, the one or more wavelengths to be dropped are passed through an ASE NSF (noise suppression filter).

17. An apparatus according to claim 16 wherein the NSF has a transmission characteristic for a wavelength range which flattens the gain characteristic of the amplification media over the wavelength range.

18. An apparatus according to claim 17 wherein the wavelength range of the NSF is about 1603 nm to 1617 nm.

19. An apparatus according to claim 1, further comprising a plurality of optical fiber taps and a plurality of photodetectors used in combinations at an input and an output of the apparatus for power monitoring a multi-wavelength optical input and a multi-wave length optical output.

20. An apparatus according to claim 1, further comprising a plurality of optical isolators, wherein each of the plurality of fiber amplification media segments is located in series with a corresponding individual optical isolator of the plurality of optical isolators.

21. An apparatus comprising:
a plurality of optical amplification media segments which are concatenated in series; wherein subsequent to each optical amplification media segment a respective one or more wavelengths in a respective wavelength range is dropped;

at least one combining element that collectively combine all of the respective one or more wavelengths dropped subsequent to each amplification media segment to produce an amplified wavelength division multiplexed optical signal;

for each pair of adjacent amplification media segments comprising a preceding segment and a subsequent segment, a respective multi-port add-drop multiplexer between the preceding segment and the subsequent segment, each multi-port add-drop multiplexer being configured to receive an amplified signal from the preceding segment, drop a wavelength to be dropped after the preceding segment, and pass a remaining signal on towards the subsequent segment.

22. An apparatus according to claim 21 further comprising wherein the at least one combining element comprises a multi-port optical multiplexer connected to combine the dropped wavelengths.

23. An apparatus according to claim 21 wherein each multi-port add-drop multiplexer is a four port add-drop multiplexer, and the at least one combining element comprises the four port add-drop multiplexers.

24. An apparatus according to claim 23 wherein each four port add-drop multiplexer comprises:
a first port for inputting a first signal which is an output of the preceding amplification media segment;
a second port for outputting a second signal which is passed to the subsequent amplification media segment for further amplification;
a third port for outputting a third signal;
a fourth port for inputting a fourth signal from a third port of a subsequent add-drop multiplexer or in the case of the last add drop multiplexer, the fourth signal being an output of the last amplification segment;
wherein each add-drop multiplexer passes the at least one wavelength to be dropped transmissively between the first port and the third port, reflects other wavelengths from the first port to the second port for further amplification, and reflects wavelengths from the fourth port to the third port for combination with the dropped wavelength.

25. An apparatus according to claim 24 wherein the wavelength 1550±6.5 nm is dropped by a first four port add-drop multiplexer after a first segment of the plurality of amplification media segments, the wavelengths 1570±6.5 nm and 1590±6.5 nm are dropped after a second segment of the plurality of amplification media segments by second and third four port add-drop multiplexers, and the wavelength 1610±6.5 nm is dropped after a third of the plurality of amplification media segments.

26. An apparatus for amplifying a multi-wavelength optical input, the apparatus comprising:
a plurality of erbium doped fiber lengths;
a plurality of multi-port optical add-drop multiplexers;
a plurality of optical power splitters;
a plurality of wavelength couplers;
at least one combining element comprising a N:1 optical multiplexer; and
at least one pump laser for supplying pump laser energy,
wherein the multi-wavelength optical input is amplified by a first amplification stage comprising a first wavelength coupler, a first length of erbium doped fiber and passed to a first multi-port optical add-drop multiplexer,
the first wavelength coupler combines the multi-wavelength optical input with a first pump laser energy supplied by the at least one pump laser,
the first length of erbium doped fiber amplifies the multi-wavelength optical input and inputs an amplified multi-wavelength optical input to a first input port of the first multi-port optical add-drop multiplexer,
wherein an amplified first wavelength of the amplified multi-wavelength optical input is dropped to a first output port of the first multi-port optical add-drop multiplexer, the amplified first wavelength being supplied to a first input port of a N:1 optical multiplexer and remaining amplified wavelengths comprising the amplified multi-wavelength optical input minus the amplified first wavelength are passed to a second amplification stage via a second output port of the first multi-port optical add-drop multiplexer, the remaining amplified wavelengths are further amplified by a second amplification stage comprising a second wavelength coupler, a second length of erbium doped fiber and a second multi-port optical add-drop multiplexer, the second wavelength coupler combines the remaining amplified wavelengths with a second pump laser energy supplied by the at least one pump laser, the second length of erbium doped fiber further amplifies the remaining amplified wavelengths and inputs remaining further amplified wavelengths to a first input port of the second multi-port optical add-drop multiplexer, wherein an amplified second wavelength of the remaining further amplified wavelengths is dropped to a first output port of the second multi-port optical add-drop multiplexer, the amplified second wavelength being supplied to a second input port of the N:1 optical multiplexer and remaining twice amplified wavelengths comprising the remaining further amplified wavelengths minus the amplified second wavelength are passed to a third multi-port optical add-drop multiplexer via a second output port of the second multi-port optical add-drop multiplexer, the remaining twice amplified wavelengths are supplied to a first input port of the third multi-port optical add-drop multiplexer, wherein an amplified third wavelength of the remaining twice amplified wavelengths is dropped to a first output port of the third multi-port optical add-drop multiplexer, the amplified third wavelength being supplied to a third input port of the N:1 optical multiplexer and a last remaining twice amplified wavelength consisting of a fourth wavelength is passed to a third amplification stage via a second output port of the third multi-port optical add-drop multiplexer, the fourth wavelength is amplified by the third amplification stage comprising a third wavelength coupler, a third length of erbium doped fiber and a fourth multi-port optical add-drop multiplexer, the third wavelength coupler combines the fourth wavelength with a third pump laser energy supplied by the at least one pump laser, the third length of erbium doped fiber amplifies the fourth wavelength and inputs an amplified fourth wavelength to a first input port of the fourth multi-port optical add-drop multiplexer, wherein the amplified fourth wavelength is supplied by a first output of the fourth multi-port optical add-drop multiplexer to a fourth input port of the N:1 optical multiplexer, The amplified first, amplified second, amplified third, and amplified fourth wavelengths are input to and combined by the N:1 optical multiplexer to generate a multi-wavelength optical output which has a substantially flat gain; and the at least one pump laser and the plurality of power splitters generate the first, second and third pump laser energies for the first, second and third erbium doped fiber lengths, respectively.

27. An apparatus according to claim 26, wherein the plurality of multi-port optical add-drop multiplexers have at least 3 ports.

28. An apparatus according to claim 26 further comprising a noise suppression filter after the third erbium doped fiber length an output of which is supplied to the N:1 optical multiplexer.

29. An apparatus according to claim 28 wherein the wavelengths occupy wavelength ranges centred at 1550 nm, 1570 nm, 1590 nm, and 1610 nm.

30. An apparatus according to claim 28, wherein the wavelength ranges are 1550±6.5 nm, 1570±6.5 nm, 1590±6.5 nm and 1610±6.5 nm.

31. An apparatus for amplifying a multi-wavelength optical input, the apparatus comprising:
a plurality of erbium doped fiber lengths;
a plurality of multi-port optical add-drop multiplexers;
a plurality of optical power splitters;
a plurality of wavelength couplers;
at least one NSF; and
at least one pump laser for supplying pump laser energy,
wherein the multi-wavelength optical input is amplified by a first amplification stage comprising a first wavelength coupler, a first length of erbium doped fiber and a first multi-port optical add-drop multiplexer,
the first wavelength coupler combines the multi-wavelength optical input with a first pump laser energy supplied by the at least one pump laser,
the first length of erbium doped fiber amplifies the multi-wavelength optical input and inputs an amplified multi-wavelength optical input to a first input port of the first multi-port optical add-drop multiplexer,
wherein an amplified first wavelength of the amplified multi-wavelength optical input is combined with a first amplified multi-wavelength optical signal comprising amplified second, amplified third and amplified fourth wavelengths output from a second amplification stage and input at a second input port of the first multi-port optical add-drop multiplexer, a combined amplified multi-wavelength optical signal of the amplified first, the amplified second, the amplified third and the amplified fourth wavelengths output at a first output port of the first multi-port optical add-drop multiplexer and remaining amplified wavelengths comprising the amplified multi-wavelength optical input minus the amplified first wavelength are passed to the second amplification stage via a second output port of the first multi-port optical add-drop multiplexer,
the remaining amplified wavelengths are further amplified by the second amplification stage comprising a second wavelength coupler, a second length of erbium doped fiber and a second multi-port optical add-drop multiplexer,
the second wavelength coupler combines the remaining amplified wavelengths with a second pump laser energy supplied by the at least one pump laser, the second length of erbium doped fiber further amplifies the remaining amplified wavelengths and supplies remaining further amplified wavelengths to a first input port of the second multi-port optical add-drop multiplexer,
wherein an amplified second wavelength of the remaining further amplified wavelengths is combined with a second amplified multi-wavelength optical signal comprising the amplified third and the amplified fourth wavelengths output from a third multi-port optical add-drop multiplexer and input at a second input port of the second multi-port optical add-drop multiplexer, the first amplified multi-wavelength optical signal comprising the amplified second, the amplified third and the amplified fourth wavelengths output at a first output port of the second multi-port optical add-drop multiplexer and remaining twice amplified wavelengths comprising the remaining further amplified wavelengths minus the amplified second wavelength are passed through a second output port of the second multi-port optical add-drop multiplexer to a third multi-port optical add-drop multiplexer,
the remaining twice amplified wavelengths are supplied to a first input port of the third multi-port optical add-drop multiplexer, wherein an amplified third wavelength of the remaining twice amplified wavelengths is combined with the amplified fourth wavelength output from the third amplification stage and input at a second input port of the third multi-port optical add-drop multiplexer, the second amplified multi-wavelength optical signal comprising the amplified third and the amplified fourth wavelengths output at a first output port of the third multi-port optical add-drop multiplexer and a last remaining twice amplified wavelength consisting of a fourth wavelength is passed to a third amplification stage via a second output port of the third multi-port optical add-drop multiplexer,
the fourth wavelength is amplified by the third amplification stage comprising a third wavelength coupler, a third length of erbium doped fiber and an ASE NSF,
the third wavelength coupler combines the fourth wavelength with a third pump laser energy supplied by the at least one pump laser,
the third length of erbium doped fiber amplifies the fourth wavelength and inputs the amplified fourth wavelength to an input of the ASE NSF and the amplified fourth wavelength output from the noise suppression filter is supplied to the second input port of the third multi-port optical add-drop multiplexer,
the combined amplified multi-wavelength optical signal of the amplified first, the amplified second, the amplified third and the amplified fourth wavelengths output from the first output port of the first multi-port optical add-drop multiplexer is a multi-wavelength optical output which has a substantially flat gain; and
the at least one pump laser and the plurality of power splitters generate the first, second and third pump laser energies for the first, second and third erbium doped fiber lengths, respectively.

32. An apparatus according to claim 31, wherein the NSF is a fused-fiber device or a thin film device.

33. An apparatus according to claim 31, wherein the plurality of multi-port optical add-drop multiplexers have at least 4 ports, a $4^{th}$ port being the add port.

34. An apparatus according to claim 31, wherein the wavelengths occupy wavelength ranges centred at 1550 nm, 1570 nm, 1590 nm, and 1610 nm.

35. An apparatus according to claim 31, wherein the wavelength ranges are 1550±6.5 nm, 1570±6.5 nm, 1590±6.5 nm and 1610±6.5 nm.

36. The apparatus of claim 31 wherein;
the plurality of erbium-doped fiber lengths comprise three erbium-doped fiber lengths;
the plurality of multi-port optical add-drop multiplexers comprise three multi-port optical add-drop multiplexers;
the plurality of optical power splitters comprise two optical power splitters;
the at least one NSF comprises one NSF;
the multi-port optical add-drop multiplexers each have four ports.

* * * * *